(12) United States Patent
Oh et al.

(10) Patent No.: US 8,966,237 B2
(45) Date of Patent: Feb. 24, 2015

(54) OPERATING SYSTEM SWITCHING METHOD IN INFORMATION PROCESSING SYSTEM INCLUDING A SWITCHER CHECKING WAKEUP STATUS IN THE PROCESSOR

(75) Inventors: Soo Cheol Oh, Daejeon (KR); Chang Won Ahn, Daejeon (KR); Kang Ho Kim, Daejeon (KR); Chei Yol Kim, Daejeon (KR); Kwang Won Koh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 246 days.

(21) Appl. No.: 13/592,959

(22) Filed: Aug. 23, 2012

(65) Prior Publication Data

US 2013/0054955 A1 Feb. 28, 2013

(30) Foreign Application Priority Data

Aug. 24, 2011 (KR) ........................ 10-2011-0084844

(51) Int. Cl.
*G06F 1/24* (2006.01)
*G06F 15/177* (2006.01)
*G06F 9/44* (2006.01)

(52) U.S. Cl.
CPC .............. *G06F 9/441* (2013.01); *G06F 9/4418* (2013.01)
USPC ................................ 713/100; 713/1; 719/319

(58) Field of Classification Search
USPC ........................................................ 713/100
See application file for complete search history.

(56) References Cited

U.S. PATENT DOCUMENTS

| | | | |
|---|---|---|---|
| 6,618,813 B1* | 9/2003 | Hsu et al. ....................... | 713/323 |
| 6,766,461 B1* | 7/2004 | Ando ............................ | 713/323 |
| 6,996,828 B1* | 2/2006 | Kimura et al. ................ | 719/319 |
| 7,877,592 B2* | 1/2011 | Sun et al. ...................... | 713/100 |
| 7,886,136 B2* | 2/2011 | Yoon ................................. | 713/1 |
| 2001/0018717 A1* | 8/2001 | Shimotono ................... | 709/319 |
| 2009/0089569 A1 | 4/2009 | Baribault et al. | |
| 2012/0191961 A1* | 7/2012 | Wu et al. ........................... | 713/2 |

FOREIGN PATENT DOCUMENTS

| | | |
|---|---|---|
| KR | 10-2007-0121354 | 12/2007 |
| KR | 10-2010-0041518 | 4/2010 |
| WO | WO 99/35576 | 7/1999 |

OTHER PUBLICATIONS

Sun et al, Supporting Multiple OSes with OS Switching, 2007, USENIX Association, pp. 357-362.*

* cited by examiner

*Primary Examiner* — Suresh Suryawanshi
(74) *Attorney, Agent, or Firm* — Staas & Halsey LLP

(57) ABSTRACT

An OS switching method for switching an OS within several seconds in an information processing system is provided. In the information processing system which includes a processor, a main memory, a nonvolatile memory, and a plurality of input/output apparatuses, an OS switcher is executed when power is applied to the information processing system. When a first OS acquires an OS switch command that indicates a switch to a second OS while the first OS is activated and running, the first OS stores identification information of the second OS and information indicating an OS switch in the nonvolatile memory, and performs STR. The OS switcher switches an OS from the first OS to the second OS after the STR is completed. Accordingly, in the system, one OS can be quickly switched to another OS within several seconds, and a previous working environment can be maintained.

5 Claims, 6 Drawing Sheets

OPERATING SYSTEM SWITCHING METHOD IN INFORMATION PROCESSING SYSTEM INCLUDING A SWITCHER CHECKING WAKEUP STATUS IN THE PROCESSOR

CLAIM FOR PRIORITY

This application claims priority to Korean Patent Application No. 10-2011-0084844 filed on Aug. 24, 2011 in the Korean Intellectual Property Office (KIPO), the entire contents of which are hereby incorporated by reference.

BACKGROUND

1. Technical Field

Example embodiments of the present invention relate in general to an operating system (OS) switching system and more specifically to an OS switching method for quickly switching and using a plurality of OSs in an information processing system.

2. Related Art

An OS is a set of programs that control and adjust the overall operation of a computer system. The programs act as an interface between hardware and application programs and manage computer resources. That is, the OS enables interaction between a user and a computer, boots the computer, determines a working procedure to control input/output operations, controls execution of programs, and stores and manages data and files.

Conventional information processing systems are capable of using only one OS for a specific duration. For the specific duration, when desiring to use another OS, the convention information processing systems need to shut down an OS that is being currently used and then use a dual boot to newly boots the other OS.

FIG. 1 illustrates a conventional OS switching method in an information processing system.

Referring to FIG. 1, when switching an OS from a first OS 110 to a second OS 130, the information processing system shuts down the first OS 110 that is being currently used, selects a second OS 130 to be used with a boot loader 120, and boots the second OS 130.

Such a mechanism includes an operation of shutting down and booting an OS that expends much time, and thus causes inconvenience to users because tens of seconds to several minutes is taken.

Moreover, since the mechanism newly boots an OS, the mechanism cannot maintain a previous working environment.

SUMMARY

Accordingly, example embodiments of the present invention are provided to substantially obviate one or more problems due to limitations and disadvantages of the related art.

Example embodiments of the present invention provide an OS switching method in an information processing system that maintains a previous working environment and quickly switches an OS.

In some example embodiments, an OS switching method in an information processing system, which includes a processor, a main memory, a nonvolatile memory, and a plurality of input/output apparatuses, includes: executing an OS switcher when power is applied to the information processing system; storing identification information of a second OS and information indicating an OS switch in the nonvolatile memory, when a first OS acquires an OS switch command that indicates a switch to the second OS while the first OS is activated and running; performing, by the first OS, suspend-to-RAM (STR); and switching, by the OS switcher, an OS from the first OS to the second OS after the STR is completed.

The performing of STR may include: storing, by the first OS, a resume point of the first OS in switch status information of the nonvolatile memory; storing, by the first OS, an internal status of the processor in the main memory; and stopping, by the first OS, the input/output apparatuses of the system.

The resume point may be a point at which a command that is executed for the first time when desiring to resume the first OS in STR is given.

The switching of an OS may include booting the second OS when the OS switcher determines that the second OS is not in the STR.

The switching of an OS may include resuming the second OS by using a pre-stored resume point of the second OS when the OS switcher determines that the second OS is in the STR.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
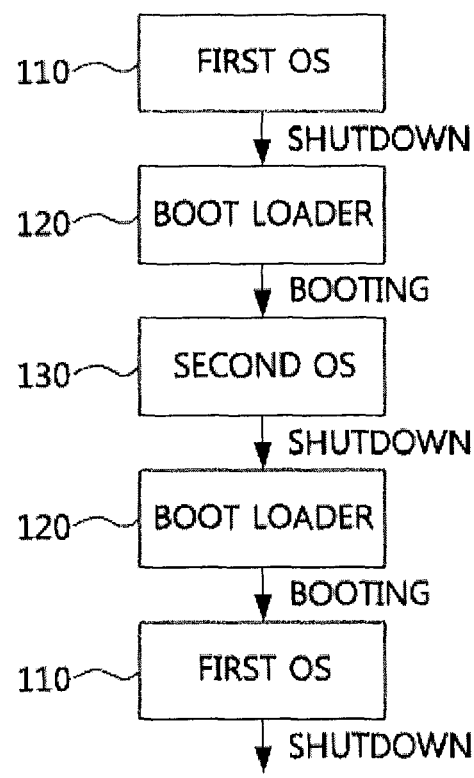
FIG. 1 is a diagram illustrating a conventional OS switching method in an information processing system.

The invention may have diverse modified embodiments, and thus, example embodiments are illustrated in the drawings and are described in the detailed description of the invention.

However, this does not limit the invention within specific embodiments and it should be understood that the invention covers all the modifications, equivalents, and replacements within the idea and technical scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising, ", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments of the invention will be described in detail with reference to the accompanying drawings. In describing the invention, to facilitate the entire understanding of the invention, like numbers refer to like elements throughout the description of the figures, and a repetitive description on the same element is not provided.

Figure 2:
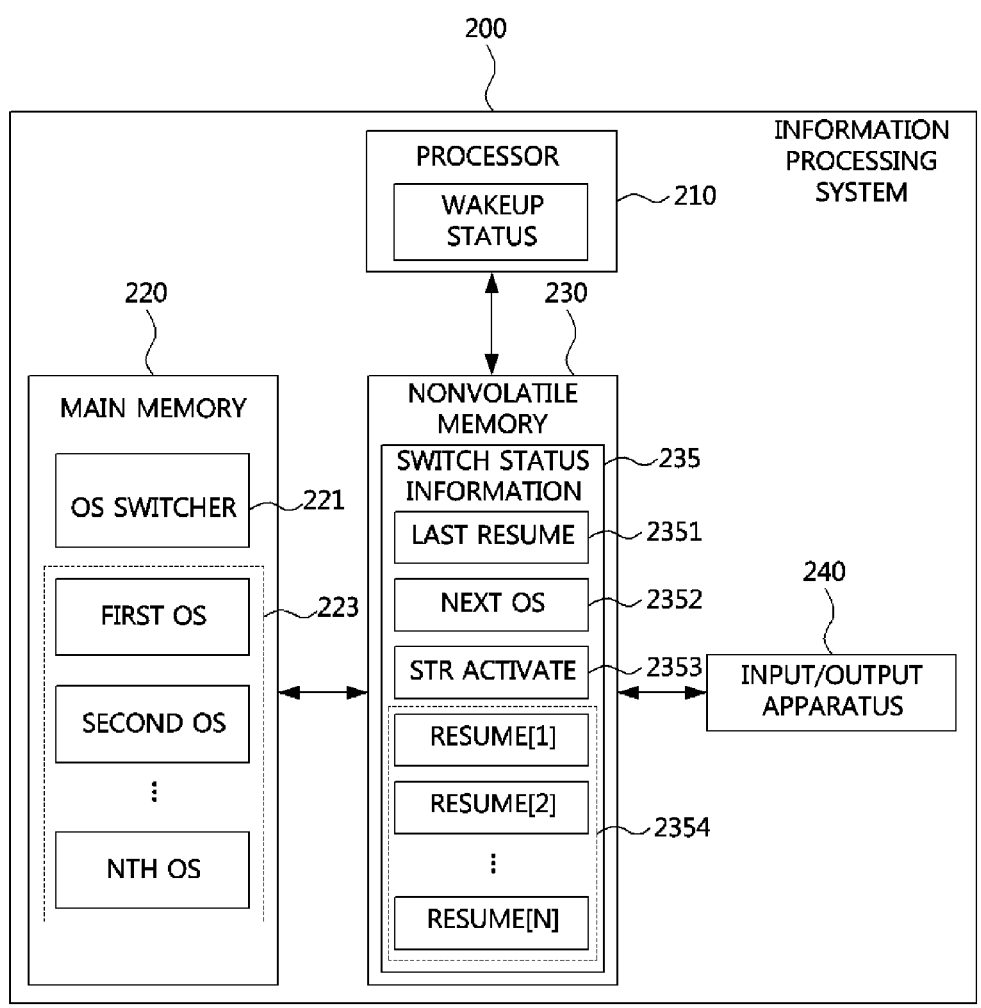
FIG. 2 is a block diagram illustrating a configuration of an information processing system that supports quick switching between OSs according to an embodiment of the present invention.
Figure 3:
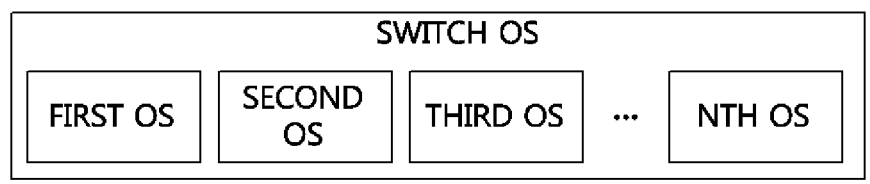
FIG. 3 is a diagram illustrating a user interface that enables a user to select an OS to run.

FIG. 2 is a block diagram illustrating a configuration of an information processing system that supports quick switching between OSs according to an embodiment of the present invention. FIG. 3 is a diagram illustrating a user interface that enables a user to select an OS to run.

Hereinafter, it is assumed that first to Nth OSs (where N is a natural number more than or equal to one) run in a system, and the first OS is activated and currently running.

Referring to FIGS. 2 and 3, an information processing system 200 that supports quick switching between OSs includes a processor 210, a main memory 220, a nonvolatile memory 230, and an input/output apparatus 240.

Here, the information processing system 200 may be included in terminals such as computers. In addition to computers, the information processing system 200 may be included in terminals such as personal digital assistants (PDAs), web pads, portable phones, etc.

First, the processor 210 includes wakeup status information necessary for an OS switch.

Here, the wakeup status information includes content that indicates whether power is initially applied to a system.

The main memory 220 may store an OS switcher 221 and N number of OSs 223. Here, when switching and using the N OSs 223 in a system, the N OSs 223 partition and use the main memory 220. Also, OS attributes in the main memory 220 may be designated as a memory start address, a size, etc.

The nonvolatile memory 230 includes switch status information 235 that is used for quickly switching between OSs in the system.

Here, the switch status information 235 includes LastResume 2351 that includes a resume point of a OS that was run last, NextOS 2352 that includes identification information of a OS to run next, STRactivate 2353 that includes information (indicating 'OS switch' for determining whether suspend-to-RAM (STR) is performed by an OS switch or power management) and information indicating 'power management', and Resume[N] 2354 that includes a resume point of the Nth OS.

Moreover, the switch status information 235 is required to be maintained even when a power source for the system is cut off, and thus stored in a nonvolatile memory information element (for example, a flash memory, or a special register in a processor).

When power is applied to the information processing system 200, the OS switcher 221 is executed. While the first OS of the information processing system 200 is activated and running, when an OS selector program installed in the first OS is executed and an OS switch command that indicates a switch to the second OS is acquired, the first OS stores identification information of the second OS and information indicating an OS switch in the nonvolatile memory 230 and then performs STR.

Here, in STR, the first OS stores the resume point of the first OS in the nonvolatile memory 230 (for example, stores a value of LastResume 2351 in Resume[1] when a value stored in LastResume 2351 is a resume point corresponding to the first OS), stores the internal status of the processor 210 in the main memory 220, and stops the input/output apparatuses 240 of the system.

Here, the resume point denotes a point at which a command that is executed for the first time when desiring to resume the first OS in STR is given.

The OS switcher 221 stored in the main memory 220 is performed when power is applied to the information processing system 200. When the STR of the first OS is completed, the OS switcher 221 determines whether the second OS is in STR, and when the second OS is in STR, the OS switcher 221 resumes the second OS by using the pre-stored resume point of the second OS.

When it is determined that the second OS is not in STR, the OS switcher 221 boots the second OS.

Accordingly, by using a quick OS switching method in the system according to an embodiment of the present invention, one OS can be quickly switched to another OS while maintaining a previous working environment.

Figure 4:
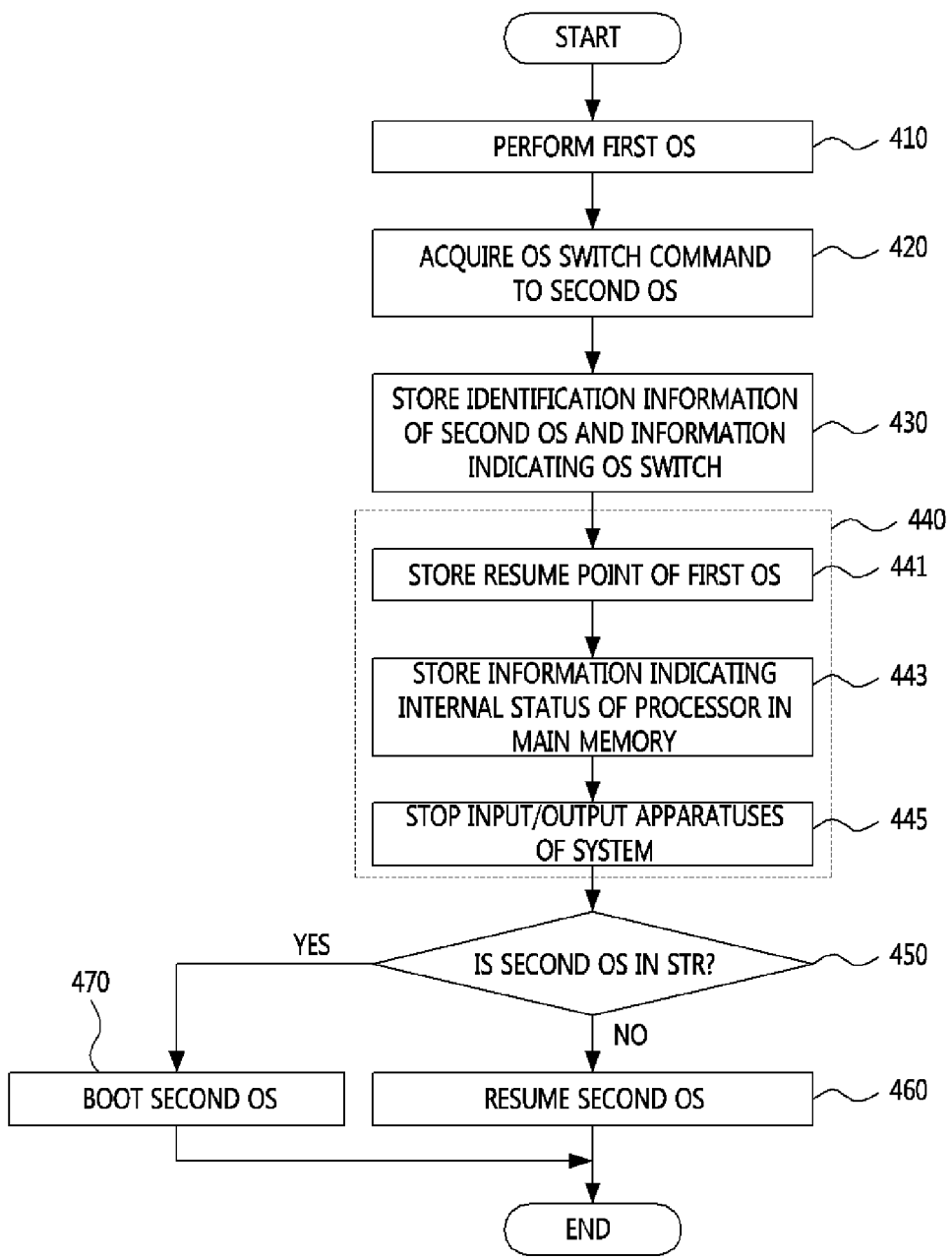
FIG. 4 is a flowchart illustrating a quick OS switching method in an information processing system according to an embodiment of the present invention.

FIG. 4 is a flowchart illustrating a quick OS switching method in an information processing system according to an embodiment of the present invention.

Referring to FIG. 4, when power is applied to an information processing system that includes a processor, a main memory, a nonvolatile memory, and a plurality of input/output apparatuses, an OS switcher is executed, and while a first OS is activated and running in a current system in operation 410, the first OS acquires an OS switch command that indicates a switch to a second OS in operation 420.

Here, the information processing system may be included in terminals such as computers. In addition to computers, the information processing system may be included in terminals such as PDAs, web pads, portable phones, etc.

When the first OS has acquired the OS switch command in operation 420, the first OS stores identification information of the second OS and information indicating an OS switch in the nonvolatile memory in operation 430.

When the first OS has stored the identification information of the second OS and the information indicating an OS switch in the nonvolatile memory in operation 430, the first OS performs STR in operation 440.

Here, the nonvolatile memory includes switch status information that is used for quickly switching between OSs in the system.

Here, the switch status information includes LastResume that includes a resume point of a OS that was run last, NextOS that includes identification information of a OS to run next, STRactivate that includes information (indicating 'OS switch' for determining whether STR is performed by an OS switch or power management) and information indicating 'power management', and Resume[N] (where N is a natural number more than or equal to one) that includes a resume point of the Nth OS.

Moreover, the switch status information is required to be maintained even when a power source for the system is cut off, and thus is stored in a nonvolatile memory information element (for example, a flash memory, or a special register in a processor).

Operation 440 of performing STR may include operation 441 in which the first OS stores the resume point of the first OS in the switch status information of the nonvolatile memory, operation 443 of storing the internal status of the processor in the main memory, and operation 445 of stopping the input/output apparatuses of the information processing system.

Here, the resume point denotes a point at which a command that is executed for the first time when desiring to resume the first OS in STR is given.

When STR performed in operation 440 is completed, the OS switcher determines whether the second OS is in STR, in operation 450.

When it is determined in operation 450 that the second OS is in STR, the OS switcher resumes the second OS by using a resume point stored in the nonvolatile memory, in operation 460.

However, when it is determined in operation 450 that the second OS is not in STR, this is a state where the second OS is not booted currently, and thus, the OS switcher boots the second OS in operation 470.

Accordingly, by using the quick OS switching method in the system according to an embodiment of the present invention, one OS can be quickly switched to another OS within several seconds, and an OS execution environment that is previously used is maintained.

Figure 5:
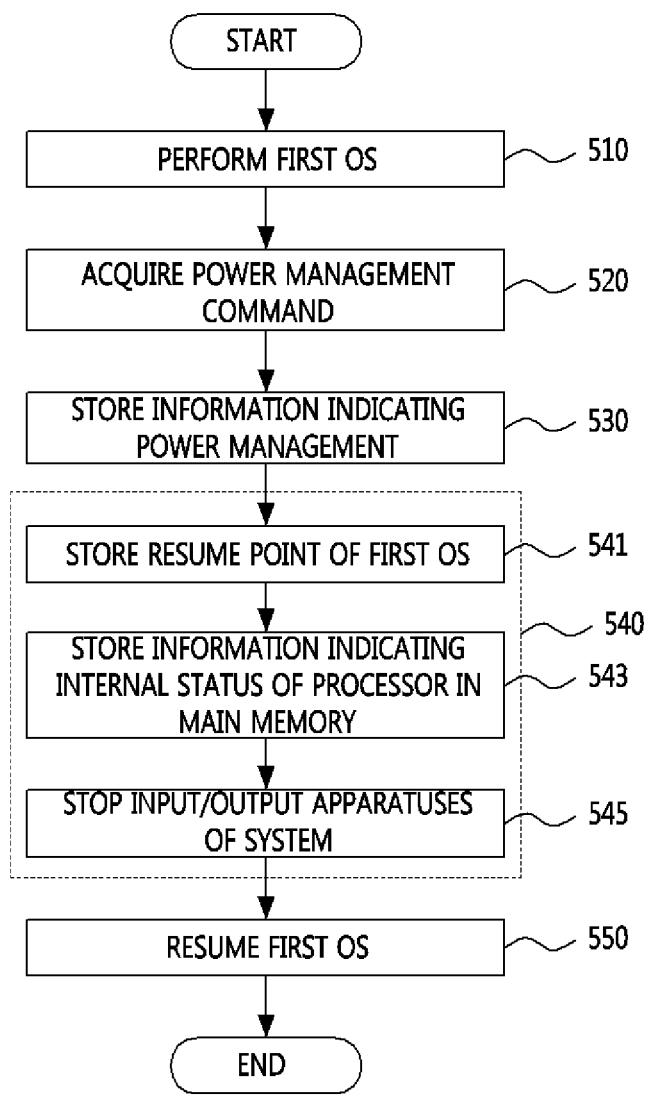
FIG. 5 is a flowchart illustrating a method of resuming an OS in performing STR through power management according to an embodiment of the present invention.

FIG. 5 is a flowchart illustrating a method of resuming an OS in performing STR through power management according to an embodiment of the present invention.

Referring to FIG. 5, when power is applied to an information processing system that includes a processor, a main memory, a nonvolatile memory, and a plurality of input/output apparatuses, an OS switcher is executed, and while a first OS is activated and running in a current system in operation 510, the first OS acquires a power management command in operation 520.

Here, the information processing system may be included in terminals such as computers. In addition to computers, the information processing system may be included in terminals such as PDAs, web pads, portable phones, etc.

When the first OS has acquired the power management command in operation 520, the first OS of the information processing system stores information indicating power management in the nonvolatile memory in operation 530.

When the first OS has stored the information indicating power management in the nonvolatile memory in operation 530, the first OS performs STR in operation 540.

Here, the nonvolatile memory includes switch status information that is used for quickly switching between OSs in the system.

Here, the switch status information includes LastResume that includes a resume point of a OS that was run last, NextOS that includes identification information of a OS to run next, STRactivate that includes information (indicating 'OS switch' for determining whether STR is performed by an OS switch or power management) and information indicating 'power management', and Resume[N] (where N is a natural number more than or equal to one) that includes a resume point of the Nth OS.

Moreover, the switch status information is required to be maintained even when a power source for the system is cut off, and thus is stored in a nonvolatile memory information element (for example, a flash memory, or a special register in a processor).

Operation 540 of performing STR may include operation 541 in which the first OS stores the resume point of the first OS in the switch status information of the nonvolatile memory, operation 543 of storing the internal status of the processor in the main memory, and operation 545 of stopping the input/output apparatuses of the information processing system.

Here, the resume point denotes a point at which a command that is executed for the first time when desiring to resume the first OS in STR is given.

When the first OS has completed STR in operation 540, the OS switcher resumes the second OS by using a resume point stored in the nonvolatile memory, in operation 550.

Figure 6:
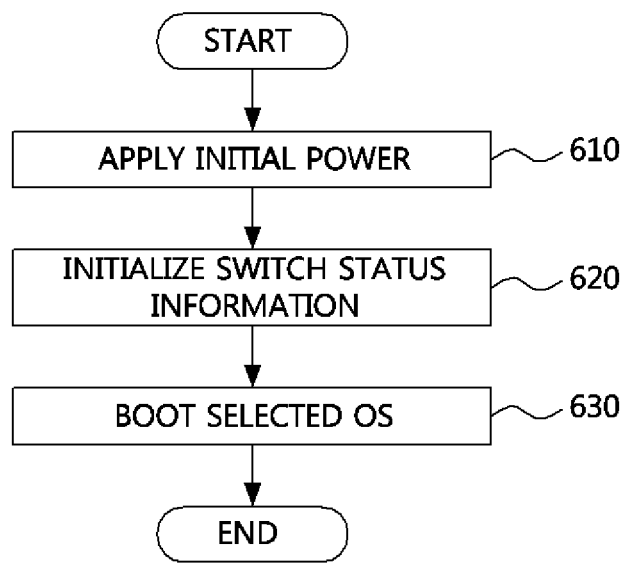
FIG. 6 is a flowchart illustrating a method of initially booting an OS in an information processing system according to an embodiment of the present invention.

FIG. 6 is a flowchart illustrating a method of initially booting an OS in an information processing system according to an embodiment of the present invention.

Referring to FIG. 6, in an information processing system that includes a processor, a main memory, a nonvolatile memory, and a plurality of input/output apparatuses, when power is applied to the information processing system, an OS switcher checks wakeup status information included in the processor to determine whether power is initially applied, in operation 610.

Here, the wakeup status information includes content that indicates whether power is initially applied to a system.

Moreover, the information processing system may be included in terminals such as computers. In addition to computers, the information processing system may be included in terminals such as PDAs, web pads, portable phones, etc.

When it is determined in operation 610 that the power is initially applied, this denotes that there is no OS which is currently stored and running in the memory, the OS switcher initializes the switch status information in operation 620, and boots a selected OS in operation 630.

In the above-described OS switching method in the information processing system according to the embodiments of the present invention, when a first OS acquires the OS switch command indicating a switch to a second OS while the first OS is activated and running, STR is performed for the first OS, and the second OS is resumed, thus maintaining a previous working environment and quickly switching an OS.

While the example embodiments of the present invention and their advantages have been described in detail, it should be understood that various changes, substitutions and alterations may be made herein without departing from the scope of the invention.

What is claimed is:

1. An operating system (OS) switching method in an information processing system which includes a processor, a main memory, a nonvolatile memory, and a plurality of input/output apparatuses, the OS switching method comprising:

executing an OS switcher when power is applied to the information processing system;

storing identification information of a second OS and information indicating an OS switch in the nonvolatile memory, when a first OS acquires an OS switch command that indicates a switch to the second OS while the first OS is activated and running;

performing, by the first OS, suspend-to-RAM (STR); and switching, by the OS switcher, an OS from the first OS to the second OS after the STR is completed, wherein the OS switcher checks wakeup status information included in the processor to determine whether the power is initially applied and, when the power is initially applied, initializes the switch status information and boots a selected OS.

2. The OS switching method of claim 1, wherein the performing of STR comprises:

storing, by the first OS, a resume point of the first OS in switch status information of the nonvolatile memory;

storing, by the first OS, an internal status of the processor in the main memory; and stopping, by the first OS, the input/output apparatuses of the system.

3. The OS switching method of claim 2, wherein the resume point is a point at which a command that is executed for the first time when desiring to resume the first OS in STR is given.

4. The OS switching method of claim 1, wherein the switching of an OS comprises booting the second OS when the OS switcher determines that the second OS is not in the STR.

5. The OS switching method of claim 1, wherein the switching of an OS comprises resuming the second OS by using a pre-stored resume point of the second OS when the OS switcher determines that the second OS is in the STR.

* * * * *